(12) United States Patent
Oplinger et al.

(10) Patent No.: US 8,949,307 B2
(45) Date of Patent: Feb. 3, 2015

(54) CLOUD-TO-DEVICE MESSAGING FOR APPLICATION ACTIVATION AND REPORTING

(75) Inventors: Andrew Oplinger, San Francisco, CA (US); Ken Leftin, San Francisco, CA (US); Philip C. Verghese, Santa Clara, CA (US); Kenneth Norton, Santa Clara, CA (US); Joseph LaPenna, San Francisco, CA (US)

(73) Assignee: Google Inc., Mountain View, CA (US)

( * ) Notice: Subject to any disclaimer, the term of this patent is extended or adjusted under 35 U.S.C. 154(b) by 459 days.

(21) Appl. No.: 13/296,678

(22) Filed: Nov. 15, 2011

(65) Prior Publication Data
US 2013/0124595 A1 May 16, 2013

(51) Int. Cl.
| G06F 15/16 | (2006.01) |
| H04L 12/00 | (2006.01) |
| H04W 4/20 | (2009.01) |
| H04W 4/02 | (2009.01) |

(52) U.S. Cl.
CPC ............... *H04L 12/00* (2013.01); *H04W 4/206* (2013.01); *H04W 4/02* (2013.01)
USPC ........... 709/201; 709/208; 707/770; 711/147; 719/313

(58) Field of Classification Search
CPC ... H04L 29/08693; H04L 67/10; H04L 12/00; H04W 4/206
USPC ........................................................ 709/201
See application file for complete search history.

(56) References Cited

U.S. PATENT DOCUMENTS

| 7,930,197 | B2 | 4/2011 | Ozzie et al. | |
| 8,533,860 | B1 | 9/2013 | Grecia | |
| 2004/0242238 | A1 | 12/2004 | Wang et al. | |
| 2007/0082681 | A1 | 4/2007 | Kim et al. | |
| 2008/0088437 | A1 | 4/2008 | Aninye et al. | |
| 2008/0088438 | A1 | 4/2008 | Aninye et al. | |
| 2010/0325194 | A1* | 12/2010 | Williamson et al. | 709/203 |
| 2011/0029598 | A1 | 2/2011 | Arnold et al. | |
| 2011/0161427 | A1 | 6/2011 | Fortin et al. | |
| 2011/0200022 | A1 | 8/2011 | Annamalai | |
| 2011/0238647 | A1 | 9/2011 | Ingram et al. | |
| 2013/0067024 | A1* | 3/2013 | Vasters | 709/217 |

OTHER PUBLICATIONS

International Search Report and Written Opinion for Application No. PCT/US2012/064996, dated Mar. 18, 2013.
"Android Cloud to Device Messaging Framework—Google Projects for Android: C2DM," http://code.google.com/android/c2dm, 9 pages (Nov. 2011).

* cited by examiner

*Primary Examiner* — Jude Jean Gilles
*Assistant Examiner* — Jaren M Means
(74) *Attorney, Agent, or Firm* — Marshall, Gerstein & Borun LLP (57) ABSTRACT

A computer-implemented method and system for updating application data for a first instance of an application via C2DM is disclosed. An application server may receive a request from the first client computing device for updated application data via a network connection. The updated application data may correspond to a second instance of the application at a second client computing device. In response to determining the second instance of the application at the second client computing device supports push notifications, the system and method may generate a C2DM message including a user ID corresponding to the first client computing device and the request for updated application data. A server may then send the C2DM message to the second client computing device, wherein the C2DM message causes the second instance to wake up and generate the updated application data. The updated application data may be returned to the first client computing device.

20 Claims, 3 Drawing Sheets

CLOUD-TO-DEVICE MESSAGING FOR APPLICATION ACTIVATION AND REPORTING

FIELD OF TECHNOLOGY

The present disclosure relates generally to location updating for a mobile devices in a computing network and more particularly to activation of mobile devices and mobile device data reports using cloud-to-device messaging (C2DM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate applications that accept push notifications from a backend server. In general, a push transaction is initiated by the information publisher in contrast to a pull transaction that is initiated by the receiver or client. Users often express interest in receiving push notifications through subscriptions and other preferences that they express in advance of the push/pull transaction. Cloud-to-Device Messaging (C2DM) is a push service that allows backend servers to send data to applications on client mobile computing devices (e.g., Android® and other types of smart phones). The service provides a simple, lightweight mechanism that servers can use to tell mobile applications to contact the server and fetch updated data. However, the C2DM messaging service cannot send a lot of user content via the messages. Rather, C2DM merely informs a mobile device application that there is new data on the server so that the application can fetch it.

Mobile devices may include global positioning system (GPS) applications or other applications and related hardware. A mapping application may communicate with a global positioning system (GPS) transceiver or other GPS hardware on the device and a backend application server to fetch a digital map of an area around the device's current position or a search location. Some mobile computing devices incorporate social networking applications and functions with GPS location functions. For example, the Latitude® application by Google Inc. or the foursquare® application by foursquare.com allows users to track other users' locations or activities via a network-connected mobile device. However, current social location applications require a user to manually submit his or her location or, in a C2DM system, the application only sends a current user location periodically to the backend server. When a user then accesses the application, the user may only view other users' locations that have either not been updated or are outdated due to period updates.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method may update application data from the first instance of an application at a first client computing device. The method may receive a request from the first client computing device for updated application data at an application server via a network connection. The updated application data may correspond to a second instance of the application at a second client computing device. In response to determining that the second instance of the application at the second client computing device supports push notifications, the method may generate a C2DM message including a user ID corresponding to the first client computing device and the request for updated application data and send the C2DM message to the second client computing device via the network connection. The C2DM message may cause the second instance to wake up and generate the updated application data.

Another embodiment of a computer-implemented method may be to update application data from the first instance of an application at the first client computing device. The method may send a request from the first instance of the application at the first client computing device to an application server via a network connection. The request for updated application data may correspond to a second instance of the application at a second client computing device. The method may also receive a first C2DM message at the second client computing device. The first C2DM message may include a user ID corresponding to the first client computing device and the request for updated application data. The method may also generate updated application data with the first C2DM message using the second instance of the application, and send the updated application data from the second client computing device. The first client computing device may receive a second C2DM message that includes a user ID corresponding to the second client computing device and the updated application data.

A client computing device may comprise a processor and a memory storing an application and instructions for execution by the processor for updating application data using C2DM. An instruction for using the processor may send a request from a first instance of the application at the client computing device to a server via a network connection. The request may be a request for updated application data corresponding to a second instance of the application at another client computing device. The request may also cause the server to send a first C2DM message to the other client computing device, the first C2DM message including a user ID corresponding to the client computing device and the request for updated application data. Another instruction for using the processor may receive a second C2DM message at the client computing device, the second C2DM message including a user ID corresponding to the other client computing device and the updated application data. The system may also include a transceiver for sending the request and receiving the second C2DM message as well as a display including a graphic representation of a location of the second client computing device from the received updated application data.

In another embodiment, a system may update application data using C2DM. The system may include a first client computing device including a processor and a memory, the memory storing a first instance of an application and instructions for execution by the processor, the instructions for using the processor to send a request for updated application data corresponding to a second instance of the application. The system may also include an application server including a processor and a memory, the memory storing instructions for execution by the processor, the instructions for using the processor to determine that the request includes a timestamp that exceeds a threshold time limit and to store updated application data. Further, the system may include a network initiated data request manager including a processor and a memory, the memory storing instructions for execution by the processor, the instructions for using the processor in response to the timestamp exceeding the threshold to generate a C2DM message including a user ID corresponding to the first client computing device and the request for updated application data. Also, the system may include a second client computing device including processor and a memory, the memory storing the second instance of the application and instructions for execution by the processor, the instructions for using the processor and the C2DM message to wake up the second instance of the application and cause the second instance of the application to generate updated application data.

Another embodiment of a computer-implemented method may update application data for a first instance of an application at a first client computing device. The method may send a request from the first instance of the application at the first client computing device to an application server via a network connection. The request may be for updated application data corresponding to a second instance of the application at a second client computing device. The method may also receive the request from the first client computing device at an application server via the network connection and, in response to the application server determining that the second instance of the application at the second client computing device supports push notifications, generating a first C2DM message including a user ID corresponding to the first client computing device and the request for updated application data, and send the first C2DM message to the second client computing device via the network connection, wherein the first C2DM message causes the second instance to wake up and generate the updated application data. The method may also receive the first C2DM message at the second client computing device, generate updated application data at the second client computing device with the first C2DM message using the second instance of the application, and send the updated application data from the second client computing device to the application server via the network connection. The application server may generate a second C2DM message at the application server. The second C2DM message may include a user ID corresponding to the second client computing device and the updated application data. The first client computing device may receive the second C2DM message at the first client computing device and display the updated application data on a display of the first client computing device.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

In the embodiments described below, a C2DM message may be used in a push transaction to wake up a client computing device. The C2DM message may include instructions to wake up the client computing device and instruct the device to send application data to a backend server. The device may then send the data to the server via a common network protocol for storage at the server or other data repository. The C2DM message may be initiated by another client device that requests the data to ensure that the other client device receives the most current or accurate application data. Embodiments of systems and methods for updating client device application data using C2DM are discussed below.

Figure 1:
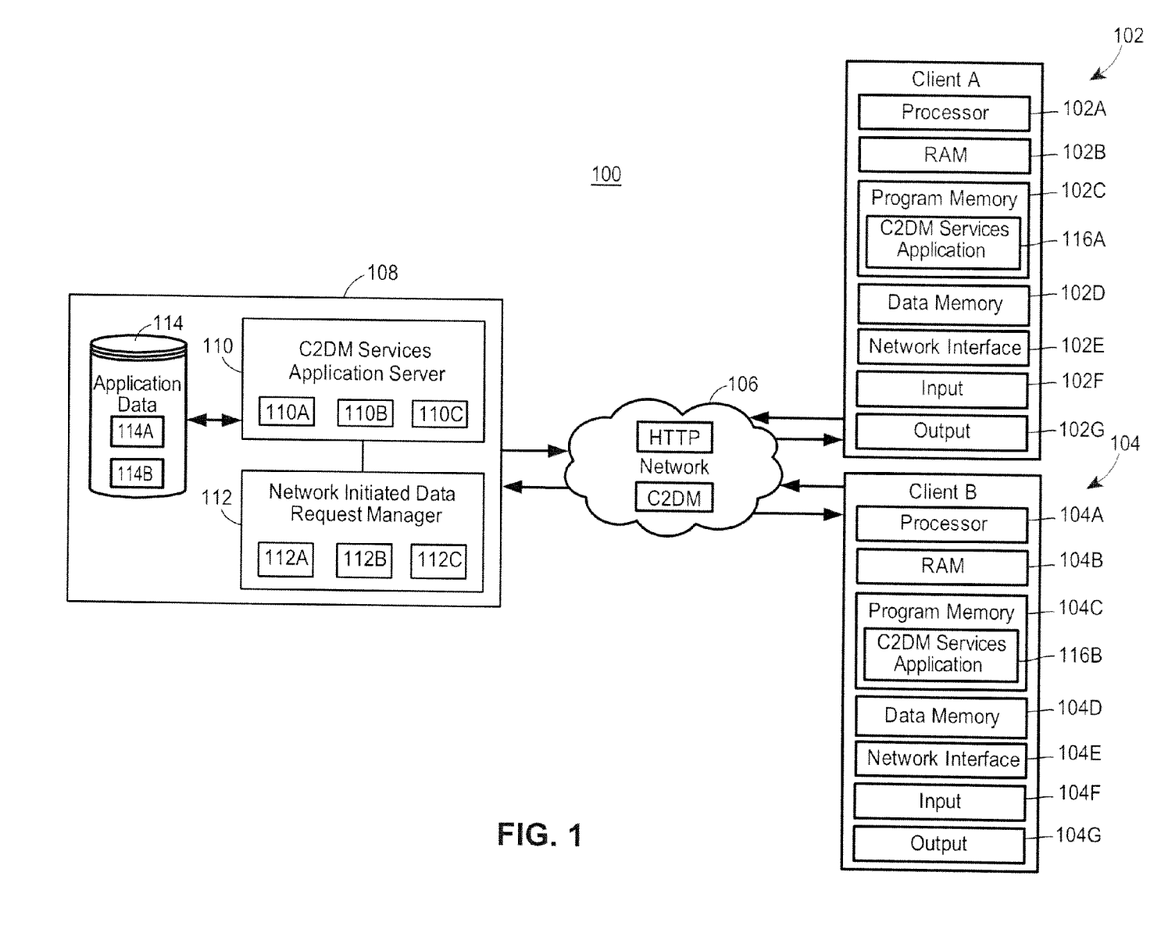
FIG. 1 is a high-level block diagram of a system for using C2DM for updating application data.

With reference to FIG. 1, a system 100 for updating client device application data using C2DM may include a first client computing device 102 and a second client computing device 104 communicatively linked via a network 106 and a backend system 108. Each of the client devices 102, 104 includes a central processing unit (CPU) 102A, 104A having one or more processors to execute computer-readable instructions, a random access memory (RAM) unit 102B, 104B to store data and instructions during operation, program memory 102C, 104C including persistent memory to store software applications, shared software components such as Dynamic-link Libraries (DLLs), and other programs executed by the CPU 102A, 102B, data storage 102D, 104D including persistent memory to store data used by the programs stored in the program storage 102C, 104C and a network interface 102E, 104E to support wired and/or wireless communications with the backend 108 and other devices. The program storage 102C, 104C and the data storage 102D, 104D may be coupled to the CPU 102A, 104A via a bus. Generally speaking, each element of the client devices 102, 104 may be implemented in any suitable manner as a single module, multiple modules, or a component of another module. Further, the memory components such as the RAM 102B, 104B, the program storage 102C, 104C, and the data storage 102D, 104D may include any suitable type of tangible, non-transitory computer-readable medium.

In the example implementation of FIG. 1, the client devices 102, 104 are smart phones. However, in general, the client device 102 may be any suitable stationary or portable computing device such as a tablet PC, a smart phone, etc. Although the client devices 102, 104 in the example of FIG. 1 include both storage and processing components, the client devices 102, 104 in other embodiments may be a so-called "thin client" that depends on another computing device for certain computing and/or storage functions. For example, in one such embodiment, the data storage 102D, 104D and the program storage 102C, 104C are external to the computing devices 102, 104 and are connected to the respective devices 102, 104 via a network link. Further, the client devices 102, 104 may be coupled to an input device 102F, 104F and an output device 102G, 104G. The input device 102F, 104F may include, for example, a pointing device such as a mouse, a keyboard, a touch screen, a trackball device, a digitizing tablet, or a microphone, and the output device 102G, 104G may include an LCD display device, a touch screen, or another suitable output device. Using the input device 102F, 104F and the output device 102G, 102G, a user can access a graphical user interface (GUI) of the client devices 102, 104.

Each component of the backend server system 108 may include one or more of the components described above as included with a client device 102, 104. For example, an application server 110 may include a processor 110A, memory 110B, and an interface 110C for executing instructions, storing instruction execution results, receiving data and instructions from other components of the system 100, etc. Similarly, a network initiated data request manager 112 may include a processor 112A, memory 112B, and an interface 112C for executing instructions, storing instruction execution results, receiving data and instructions from other components of the system 100, etc. In some embodiments, the network initiated data request manager is a C2DM server. The application server 110 may be coupled to a data repository 114 for storing data generated from instructions executed at the backend 108 or the client devices 102, 104. For example, the application data repository 114 may store user profile data 114A, instruction results data 114B, or other data corresponding to a client device application 116A or 116B or the servers 110, 112. In some embodiments, the application server 110 supports C2DM services for the client device applications 116A, 116B. The application server may be the backend server for an application that allows a user of a client computing device 102 to request or manage data that is resident on or produced by various other client computing devices 104 when those other users have indicated a preference to do so. In some embodiments, the application server 110 manages requests among users for data that may be used by different instances of the same application executing on the various client devices. For example, the application server 110 may be a backend server for a social networking application that allows users at mobile computing devices (e.g., smart phones, tablet computers, etc.) to track the location of various other users at computing devices that execute instances of the same application. Where the application 116A, 116B is a location-sharing, social networking, the user profile data 114A may include a user ID corresponding to the user executing the application on a client device (e.g., User A executing a first instance of the application 116A on client device A 102) and a list a other application users that have indicated a preference to allow the user to track their locations using the application (e.g., User B executing a second instance of the application 116B on client device B 104). Likewise, the operation results data 114B may include location data corresponding to each of the application users and a timestamp indicating a time the data was last updated at a device 102, 104 and stored in the repository 114. The communication of location data 114B to client devices may use C2DM services to ensure that the data is timely and relevant for the requesting user.

Figure 2:
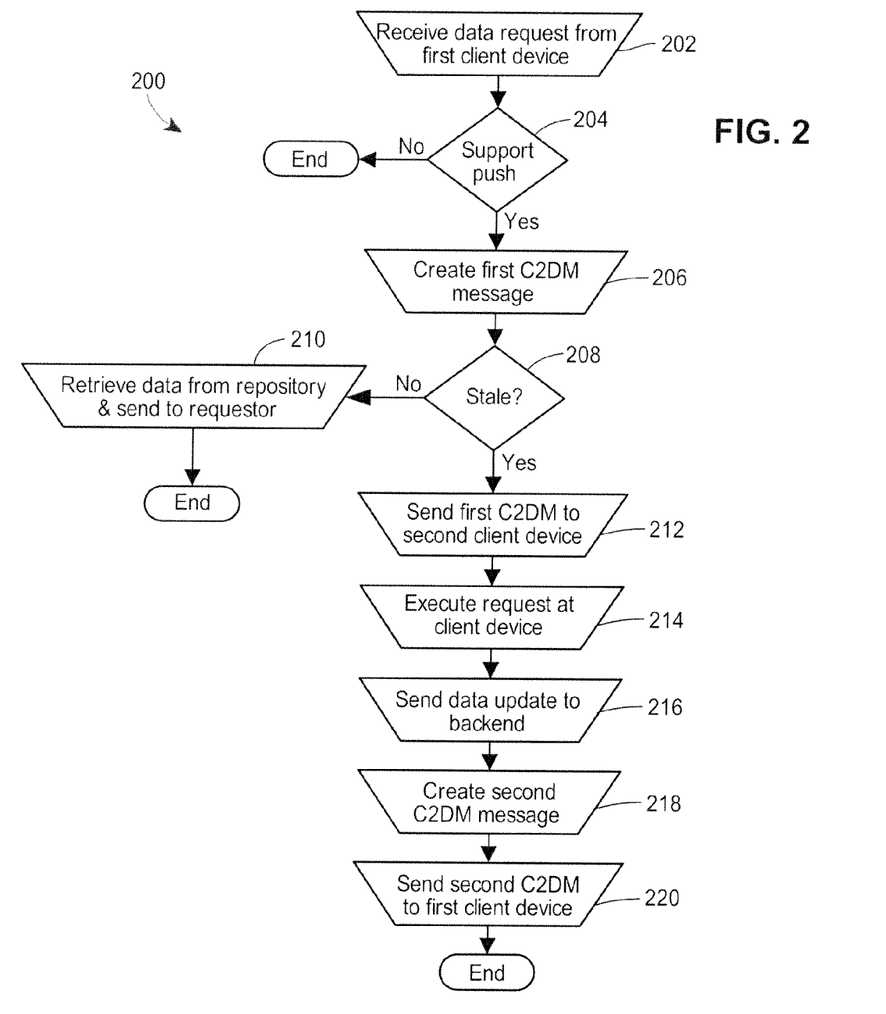
FIG. 2 is an exemplary flow chart of one method for updating application data using C2DM.

With further reference to FIG. 1, FIG. 2 illustrates an embodiment of a method 200 for using the push mechanisms of C2DM to pull information from client computing devices. The method 200 may include one or more blocks, modules, functions or routines in the form of computer-executable instructions that are stored in a tangible computer-readable medium and executed using a processor of a computing device (e.g., the client computing devices 102, 104, servers 110, 112, a smart phone, tablet computer, or a mobile computing device, or other computing device, as described herein). The method 200 may be included as part of any backend 108 or client computing device 102, 104 modules of a computing environment for a system 100 for updating client device application data using C2DM, for example, or as part of a module that is external to such a system. For example, the method 200 may be part of a C2DM services application module 116A, 116B and/or C2DM services application server 110, or a Network Initiated Request Manager 112.

FIG. 2 will be described with reference to FIG. 1 for ease of explanation, but the method 200 can of course be utilized with other objects and user interfaces.

At block 202, a backend component 108 may receive an indication that an application instance 116A requests data from another client device 104. In some embodiments, the first client computing device 102 may send a message using a common network protocol (e.g., HTTP, HTTPS, FTP, SSH, SMTP, etc.) via a network 106 to a backend server system 108. The application server 110 may receive the message and the processor 110A may execute instructions stored in the memory 110B to determine that the message includes a request for application data at the second client device 104. In some embodiments, the other client device 104 may include a second application instance 116B of the same application that executes on the first client device 102. For example, where the application 116A, 116B includes a location-sharing, social networking application, the request sent from a first client device 102 and received at the backend 108 from the first client device 102 may include a request for location data corresponding to the user of the second client device 104. In some embodiments, the request may be sent by the client device 102 in a common network protocol format over a cellular network transceiver of the device 102 and received in the same format at the backend 108. Of course, the first device 102 may send the request in various other formats as known to one of ordinary skill in the art.

At block 204, the method 200 may determine if a client-side application is configured to support push notification or other techniques to receive a C2DM message. For example, the method 200 may check user profile data 114A to determine if a registered instance of a client device application 116A, 116B or the device itself 102, 104 supports push notifications. In some embodiments, a backend 108 component may execute an instruction for block 202. For example, an instruction stored in the memory 110B of the C2DM services application server 110 may be executed by the processor 110A using the user profile data 114A. A category or field of the user profile data 114A may include an indication of whether the user of the device 102, 104 prefers to receive push notifications. Additionally, the method 200 may check an application specific user preference. For example, a user profile 114A may include data indicating that the user prefers to receive push notifications for one type of application 116A, 116B, but not another. Where the application 116A, 116B includes a location-sharing, social networking application, the method 200 may determine if the user profile data 114A includes an indication that the device supports or the user prefers push notifications and also if the user profile data 114A includes an indication that a network-initiated location refresh operation is supported. If no, then the method may end. If yes, then the method may continue to block 204.

Figure 3A:
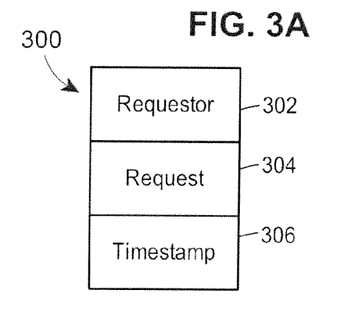
FIG. 3A is an exemplary data structure for a C2DM message to update application data.

At block 206, a backend component 108 may pass the request of block 202 to another backend component to create a C2DM message for the request. In some embodiments, a network initiated data request manager 112 may receive the request from the application server 110 via an interface 112C and use the processor 112A to execute an instruction stored in the memory 112B to create a C2DM message. With reference to FIG. 3A, a first C2DM message 300 may include data fields that facilitate returning accurate and timely information to a requesting device 102. In some embodiments, the network initiated data request manager 112 may execute instructions to create a C2DM message including data that identifies a requestor 302, the data being requested 304, and a time of the request 306. In some embodiments, block 206 may add the same timestamp 306 to a user profile 114A.

At block 208, the method 200 may compare the timestamp 306 and another timestamp associated with application data 114B to determine a data age between the data 114B and potentially new data returned in response to the request 304. If the block 208 determines that an age of the data 114B corresponding to a user profile of the second device 104 does not exceed a threshold, then block 208 may proceed to block 210. Block 210 may include instructions to cause the network initiated data request manager 112 to retrieve data 114B from the repository 114 in response to the request 304, where the data 114B currently stored in the repository 114 corresponds to a timestamp that does not exceed the threshold. In some embodiments, the threshold may be two minutes. For example, where the application instances 116A, 116B include a location-sharing, social networking application, a user's location that is more than two minutes old may be considered "stale" or inaccurate. Thus, when location data 114B within the repository 114 is less than two minutes old, then block 210 may retrieve the location data 114B from the repository 114 rather than proceeding block 214. Otherwise, if the threshold is exceeded (e.g., the timestamp comparison indicates that the data 114B is stale), then block 208 may proceed to block 212. Block 212 may include instructions to send a C2DM message 300 to the second client device 104 via the network 106 and block 214 may include instructions to execute the request 304 of the sent C2DM 300. In general, the C2DM 300 received by the application 116B at the second client device 104 may be passed via the network interface 104E to the application 116B. The application 116B may execute instructions to fulfill the request 304 of the received C2DM 300. For example, where the application 116B includes a location-sharing, social networking application, the C2DM 300 may cause the application 116B to wake up and execute an instruction to update the location data 114B via a GPS transceiver at the device 104 or other method.

100261 Block 216 may include instructions to send the data update performed at block 214 to the backend 108 via the network 106. In some embodiments, the application 116B may execute instructions to send a data update via a common network protocol that was initiated by the C2DM message 300 to the backend 108. For example, the application 116B may send the updated data 114B to the application server 110 where the updated data 114B is stored in the repository 114 corresponding to the user profile data 114A of the user that sent the update. In some embodiments, the updated data 114B may be sent to the backend 108. The update may include an updated timestamp, as well. At block 218, the application server 110 may execute instructions to send the data update to the network initiated data request manager 112. With reference to FIG. 3A, the manager 112 may then execute instructions to compose a second C2DM message 350 including the updated data 114B. The second C2DM message 350 may include an identification of the sender 352 (e.g., user ID or other identification recognized by the application instances 116A, 116B, etc.), the data update 354, and a timestamp 356. Block 220 may include instructions to send the second C2DM message 350 to the first client device 102 via the network 106. Like the first C2DM message 300, the second C2DM message 350 may be received by the network interface 102E and processed by the application 116A. The application 116A may process the second C2DM message 350 by using the data update 354 as well as data identifying the sender 352 of the update 354. Where the application instances 116A, 116B include a location-sharing, social networking application, the application 116A on the device 102 may process the updated data 354 to show a new location for the user of the second client device 104 on a graphic representation of the second user's location (i.e., the location of the second client computing device) within a display 102G of the first client device 102.

As described above, the system 100 and method 200 may use the push transactions of C2DM to pull a data update from one client device 102 to another 104. Where a client application 116A, 116B relies on accurate and timely data from other sources, C2DM may be used as described herein to provide a lightweight and efficient method for assuring data freshness while conserving the energy use of the client devices. Rather than rely on periodic data updates that are automatically send from the client devices 102, 104 to the backend 108 which may cause unnecessary energy drain on the devices, the embodiments described herein send data updates in response to specific update requests. By sending updates in response to specific requests, the embodiments described herein may cause the client devices 102, 104 to send fewer requests and updates while ensuring that the received data is both timely and accurate.

Figure 3B:
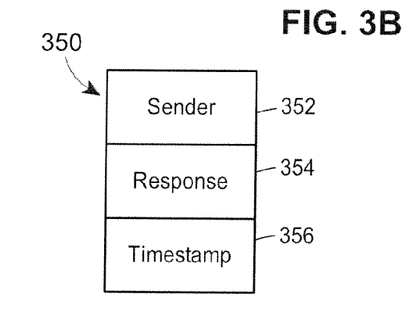
FIG. 3B is another exemplary data structure for a C2DM message to update application data.
Figure 4:
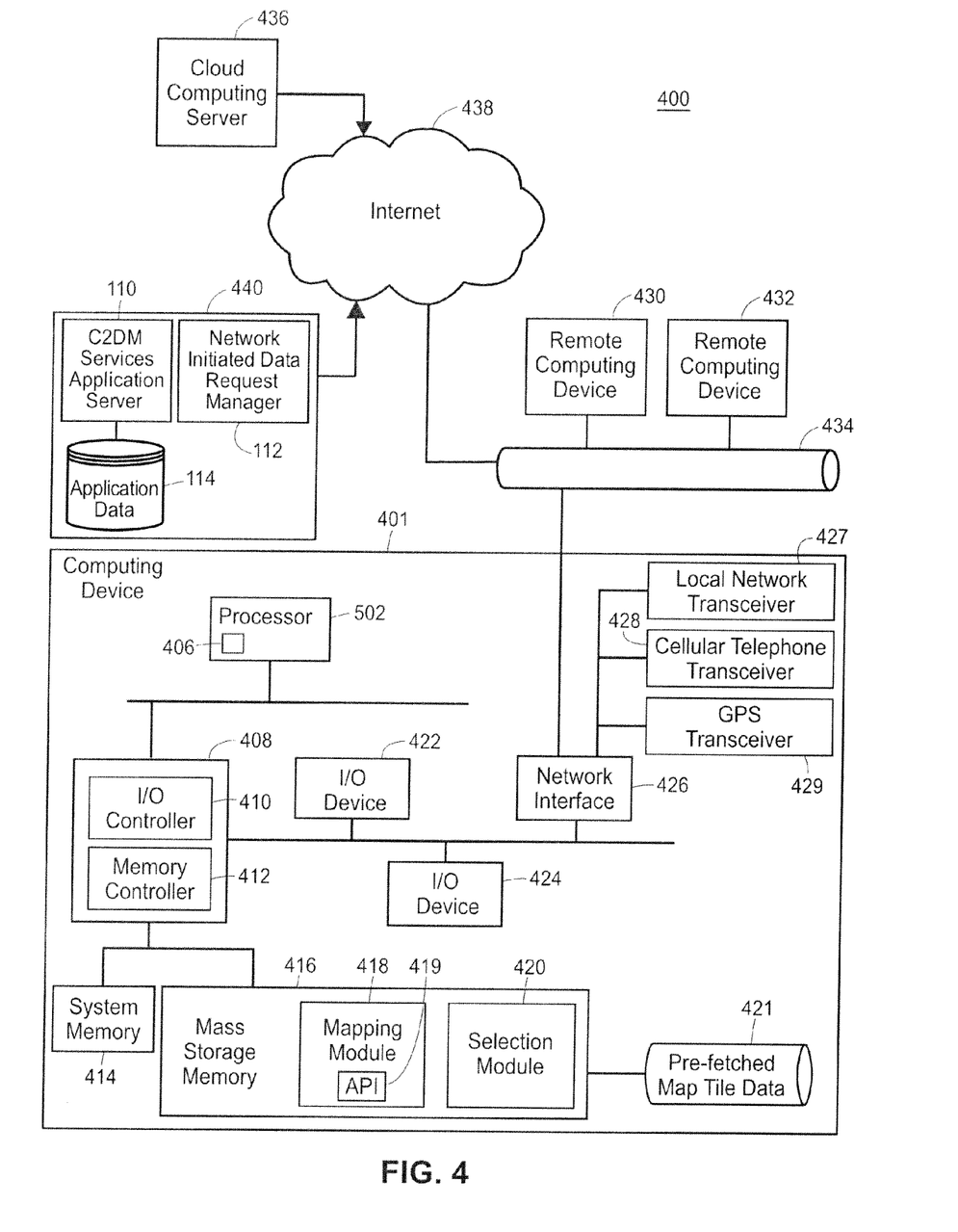
FIG. 4 is high-level block diagram of a computing environment that implements a system and method for updating application data using C2DM.

FIG. 4 is a high-level block diagram of an example computing environment for a system using C2DM to update mobile device application data having a computing device 401 that may be used to implement the method and systems described herein. The computing device 401 may include a client computing device 102 (e.g, a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example C2DM application data updating system 400 may be used to implement and execute the example system of FIG. 1, the method of FIG. 2, the data structures of FIGS. 3A and 3B, and the like. Although the example system 400 is described below as including a plurality of peripherals, interfaces. chips, memories, etc., one or more of those elements may be omitted from other example processor systems used to implement and execute the example system 100 to use C2DM to update application data. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416.

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement a C2DM services application 418 having an API 419 (including instructions as described by the method 200 of FIG. 2), the mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 400. Thus, a module, block, function, operation, procedure, routine, step, and method can be implemented in hardware. firmware, and/or software. In one embodiment, program modules and routines (e.g., the C2DM services application 418, the API 419, etc.) are stored in mass storage memory 416, loaded into system memory 414, and executed by a processor 402 or can be provided from computer program products that are stored in tangible computer-readable storage mediums (e.g. RAM, hard disk, optical/ magnetic media, etc.). Mass storage 416 may also include a cache memory 421 storing application data, user profile data, and timestamp data corresponding to the application data, and other data for use by the C2DM services application 418.

The peripheral I/O controller 410 performs functions that enable the processor 402 to communicate with peripheral input/output (I/O) devices 422 and 424, a network interface 426, a cellular network transceiver 427, a local network transceiver 428, and a GPS transceiver 429 (via the network interface 426) via a peripheral I/O bus 428. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 422 and 424 may be used with the C2DM services application 418 to receive GPS data from the GPS transceiver 429, send the GPS data to the backend components of the system 100, render, and display application data (e.g., maps and user interfaces showing location data corresponding to other computing devices 501) as described in relation to the figures. A cellular telephone transceiver 427 may be resident with the local network transceiver 428. The local network transceiver 428 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example. an Ethernet device, an asynchronous transfer mode (ATM) device, an 802.11 wireless interface device, a DSL modem, a cable modem, a cellular modem, etc., that enables the system 100 for updating client device application data using C2DM to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the C2DM services application 418 on remote computing devices 430 and 432. The remote computing devices 430 and 432 may communicate with the computing device 401 over a network link 434. For example, the computing device 401 may receive location data created by a C2DM services application executing on a remote computing device 430, 432. In some embodiments, the C2DM services application 418 may be retrieved by the computing device 401 from a cloud computing server 436 via the Internet 438. When using the cloud computing server 436, the retrieved application 418 may be programmatically linked with the computing device 401. The C2DM services application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. In some embodiments, the C2DM services application 418 may communicate with back end components 440 such as the C2DM services application server 110, the network initiated data request manager 112, the application data repository 114, etc, via the Internet 438 or other type of network.

Using the systems and procedures described above, the system for updating client device application data using C2DM 100, 400 may inform client computing device application to update data associated with the application that is accessible at various other client devices. For example, where the client devices execute a location-sharing, social networking application, a first user wanting a location update for a second user may cause a cause a C2DM message to be sent to a second user's second client device. That C2DM message may wake up the application executing on the second client device and cause the application to send a location update to the first user's client device. The methods for location updating described herein may be used for a list of friends associated with a user's profile such that all friends' locations may be updated or only a subset of friends' locations. C2DM may reduce the number of updates a client device sends to other client devices in an effort to keep the data current. For example, rather than sending periodic data updates, the systems and methods described herein may only send data updates in response to a user request. Furthermore, data updates will immediate and appear to be more current than periodic updates. Of course, the systems and methods described herein may present a user with a user interface from which the user is able to opt-out of any of the data push or pull data updating methods described herein.

The system 400 may include but is not limited to any combination of a LAN, a MAN, a WAN, a mobile, a wired or wireless network, a private network, or a virtual private network. Moreover, while only three client computing devices 401, 430 and 432 are illustrated in FIG. 4 to simplify and clarify the description, it is understood that any number of client computers are supported and can be in communication within the system 100, 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner.

In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software)may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a smart phone, a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of methods, algorithms or symbolic representations of operations on data stored as bits or binary digital signals within a machine memory (e.g., a computer memory). These methods, algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however. are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for updating client device application data using C2DM for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system for updating client device application data using C2DM through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for updating application data for a first instance of an application at a first client computing device, the method comprising:
receiving a request from the first client computing device for updated application data at an application server via a network connection, the updated application data corresponding to a second instance of the application at a second client computing device; and
in response to determining that the second instance of the application at the second client computing device supports push notifications, sending a C2DM message consisting of a timestamp, a user ID corresponding to the first client computing device, and the request for updated application data to the second client computing device via the network connection, wherein the C2DM message causes the second instance to wake up and generate the updated application data.

2. The computer-implemented method of claim 1, further comprising:
receiving the updated application data at the application server via the network connection;
generating another C2DM message including a user ID corresponding to the second client computing device and the updated application data; and
sending the other C2DM message to the first client computing device.

3. The computer-implemented method of claim 1, wherein the timestamp indicates time the request was received by the application server.

4. The computer-implemented method of claim 3, further comprising using the timestamp to determine that application data of the application server is stale by determining the application data of the application server is older than the request by more than a threshold.

5. The computer-implemented method of claim 4, further comprising generating the C2DM message and sending the C2DM message to the second client computing device via the network connection in response to determine the application data of the application server is stale.

6. The computer-implemented method of claim 2, further comprising displaying the updated application data on a display of the first client computing device, the display including a graphic representation of a location of the second client computing device.

7. A computer-implemented method for updating application data for a first instance of an application at a first client computing device, the method comprising:
sending a request from the first instance of the application at the first client computing device to an application server via a network connection, the request for updated application data corresponding to a second instance of the application at a second client computing device;
receiving a first C2DM message at the second client computing device, the first C2DM message consisting of a timestamp, a user ID corresponding to the first client computing device, and the request for updated application data;
generating updated application data with the first C2DM message using the second instance of the application;
sending the updated application data from the second client computing device; and
receiving a second C2DM message at the first client computing device, the second C2DM message including a user ID corresponding to the second client computing device and the updated application data.

8. The computer-implemented method of claim 7, wherein the timestamp indicates a time the request was sent from the first client computing device.

9. The computer-implemented method of claim 8, further comprising using the timestamp to determine that application data of the second client computing device is stale by determining the application data is older than the request by more than a threshold.

10. A client computing device comprising:
a processor;
a memory storing an application and instructions for execution by the processor, the instructions for using the processor to:
send a request from a first instance of the application at the client computing device to a server via a network connection, the request for updated application data corresponding to a second instance of the application at another client computing device, wherein the request causes the server to send a first C2DM message to the other client computing device, the first C2DM message including a user ID corresponding to the client computing device and the request for updated application data, wherein the other client device only sends updated application data to the server in response to the data request by the client computing device; and
receive a second C2DM message at the client computing device, the second C2DM message including a user ID corresponding to the other client computing device and the requested updated application data;
a transceiver for sending the request and receiving the second C2DM message; and
a display including a graphic representation of a location of the second client computing device from the received updated application data.

11. The client computing device of claim 10, wherein the first C2DM message further includes a timestamp indicating a time the request was sent by the client computing device.

12. The client computing device of claim 11, wherein the instructions further use the processor to determine that application data of the server is stale by determining the application data is older than the timestamp by more than a threshold.

13. The client computing device of claim 12, wherein the transceiver receives the second C2DM message in response to the application data of the server being stale.

14. A system for updating application data using C2DM comprising:
- a first client computing device including a processor and a memory, the memory storing a first instance of an application and instructions for execution by the processor, the instructions for using the processor to send a request for updated application data corresponding to a second instance of the application;
- an application server including a processor and a memory, the memory storing instructions for execution by the processor, the instructions for using the processor to determine that the request includes a timestamp that exceeds a threshold time limit and to store updated application data;
- a network initiated data request manager including a processor and a memory, the memory storing instructions for execution by the processor, the instructions for using the processor in response to the timestamp exceeding the threshold to generate a C2DM message including a user ID corresponding to the first client computing device and the request for updated application data;
- a second client computing device including a processor and a memory, the memory storing the second instance of the application and instructions for execution by the processor, the instructions for using the processor and the C2DM message to wake up the second instance of the application and cause the second instance of the application to generate updated application data, wherein the second client computing device only sends updated application data to the application server in response to the request from the first client computing device.

15. The system of claim 14, wherein the application server further includes instructions for receiving the updated application data and sending a second C2DM message to the first client computing device.

16. The system of claim 15, wherein the network initiated data request manager further includes instructions to generate the second C2DM message including a user ID corresponding to the second client computing device and the updated application data.

17. The system of claim 16. wherein the first client computing device further includes instructions for using the updated application data of the second C2DM message to execute an instruction of the first application instance.

18. A computer-implemented method for updating application data for a first instance of an application at a first client computing device, the method comprising:
- sending a request from the first instance of the application at the first client computing device to an application server via a network connection, the request for updated application data corresponding to a second instance of the application at a second client computing device;
- receiving the request from the first client computing device at an application server via the network connection;
- sending a first C2DM message to the second client computing device via the network connection in response to the application server determining that the second instance of the application at the second client computing device is configured to receive push notifications, wherein the first C2DM includes a user ID corresponding to the first client computing device and the request for updated application data message and causes the second instance to wake up and generate the updated application data;
- receiving the first C2DM message at the second client computing device;
- generating updated application data with the second instance of the application at the second client computing device, the second application instance using the first C2DM message;
- sending the updated application data from the second client computing device to the application server via the network connection, wherein the second client computing device only sends updated application data to the application server in response to the request from the first client computing device;
- receiving a second C2DM message at the first client computing device, the second C2DM message including a user ID corresponding to the second client computing device and the updated application data; and
- displaying the updated application data on a display of the first client computing device.

19. The computer-implemented method of claim 18, wherein the first client computing device uses the second C2DM to display a graphic representation of a location of the second client computing device, the location corresponding to the updated application data.

20. The computer-implemented method of claim 19, wherein generating updated application data at the second client computing device with the first C2DM message using the second instance of the application includes accessing a GPS transceiver of the second client computing device using the second instance of the application.

* * * * *